March 11, 1941.  W. H. SCHRAY  2,234,358
BASKET CARRYING CART
Filed Oct. 12, 1940  2 Sheets-Sheet 1
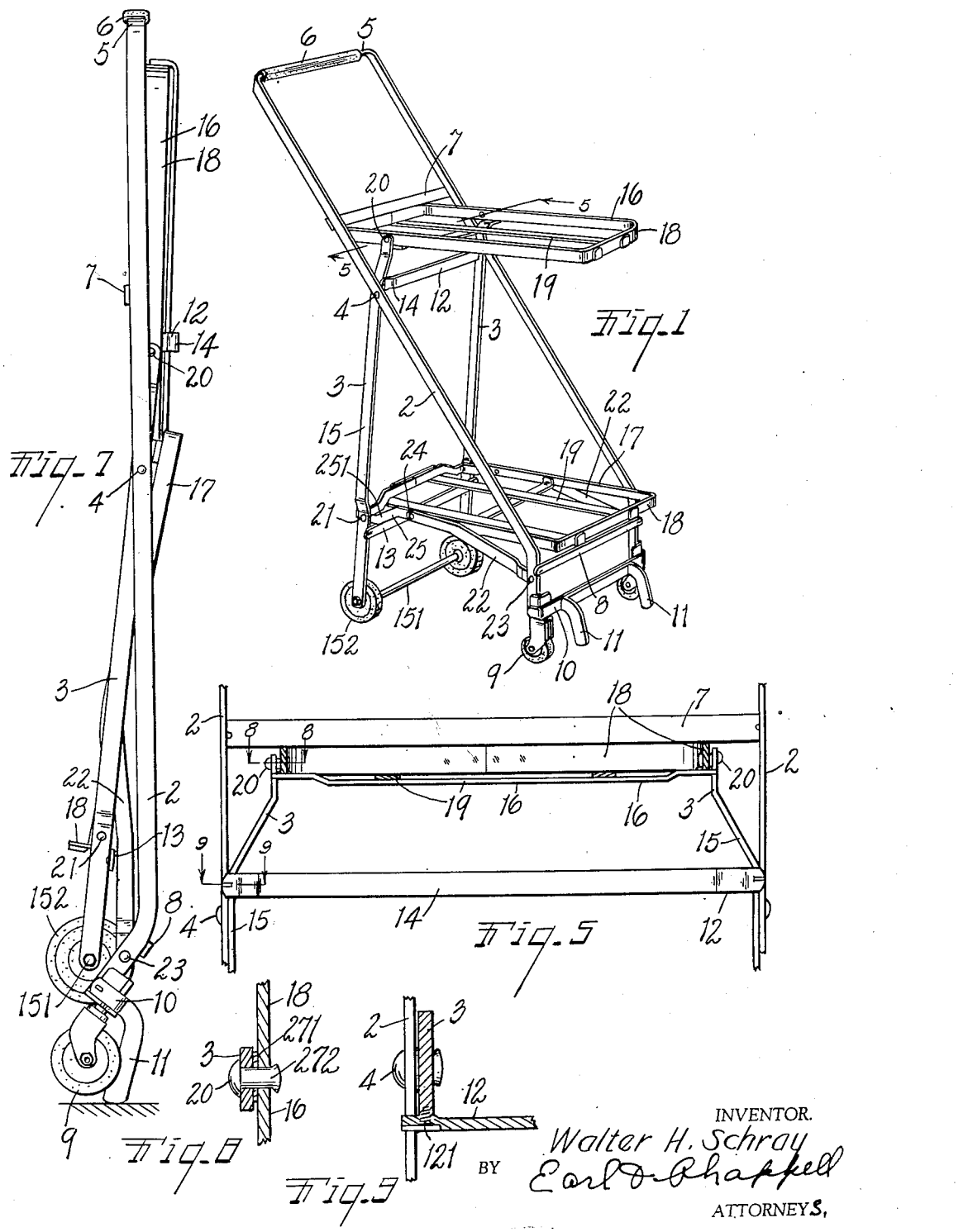
INVENTOR.
Walter H. Schray
BY Earl D. Chappell
ATTORNEYS.

March 11, 1941.   W. H. SCHRAY   2,234,358
BASKET CARRYING CART
Filed Oct. 12, 1940   2 Sheets-Sheet 2
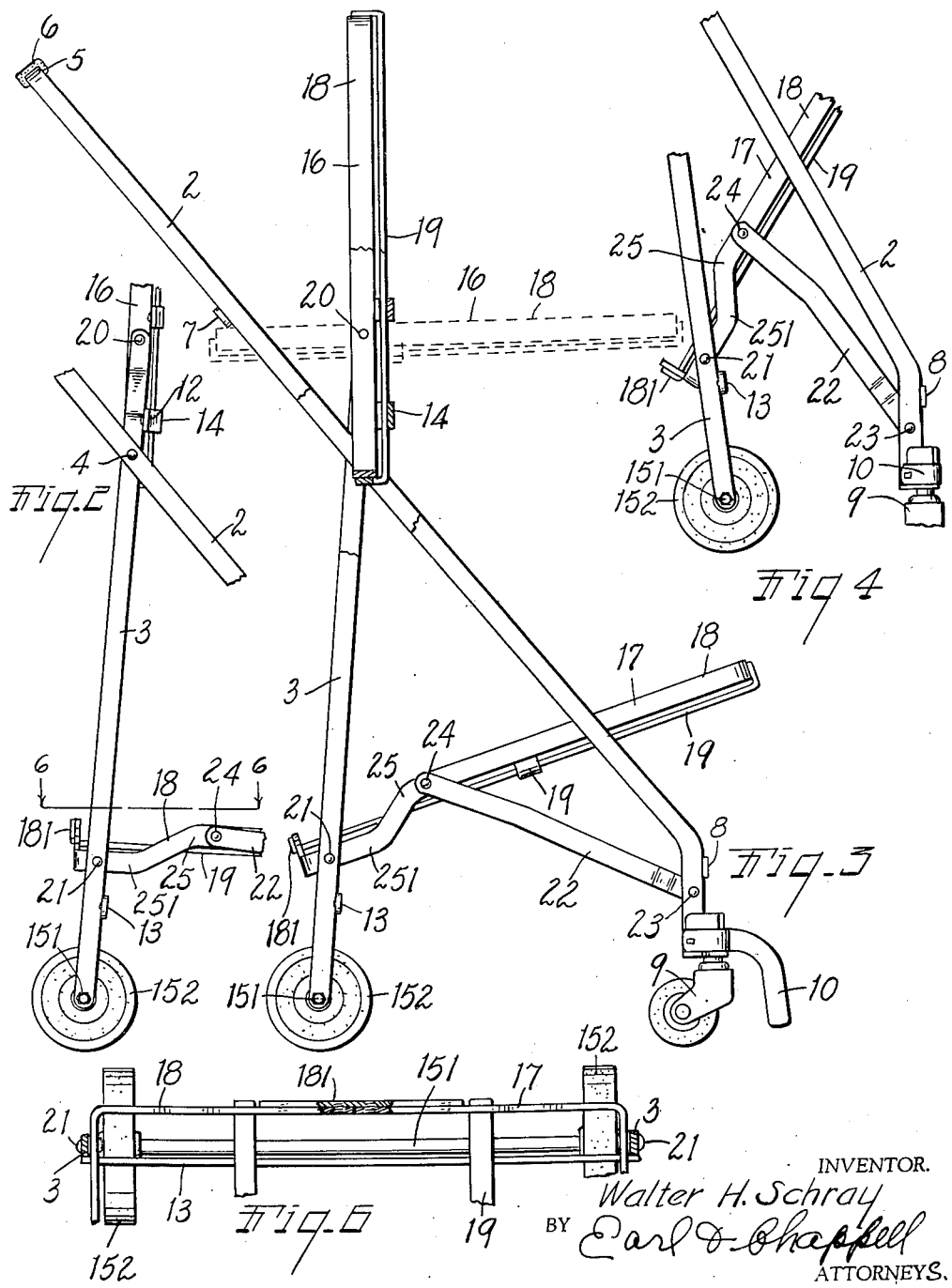
INVENTOR.
Walter H. Schray
BY Earl D. Chappell
ATTORNEYS.

Patented Mar. 11, 1941

2,234,358

UNITED STATES PATENT OFFICE 2,234,358

BASKET CARRYING CART

Walter H. Schray, Battle Creek, Mich., assignor to United Steel and Wire Company, Battle Creek, Mich.

Application October 12, 1940, Serial No. 360,889

14 Claims. (Cl. 280—36)

This invention relates to improvements in basket carrying carts.

The main objects of my invention are:

First, to provide a cart or carriage well adapted for customers' use as a basket carrier in a self-serve store, having provisions for enabling the same to be readily collapsed to a very compact form for shipment, storage, and the like.

Second, to provide a cart or similar structure having means for automatically collapsing the same by a single manipulation which may be effected with great ease and rapidity.

Third, to provide a structure of the type described including a pair of basket carrying racks, shelves, or equivalent supports, one of which is manually collapsible and is associated with the remainder of the structure in a manner to serve as an automatic collapsing means for the structure as a whole.

Fourth, to provide an automatically collapsible cart or carriage of the type described which is exceedingly simple and economical in its construction so as to be light in weight though amply strong and rigid for its intended purposes.

Fifth, to provide a fully collapsible cart or carriage of the type described having provision for storing the same on end whereby the weight is removed from the wheels thereof to thereby prevent skidding from upright stacked position.

Further objects relating to details and economies of my invention will appear from the description to follow. The invention is defined in the claims.

An embodiment of the features of my invention is illustrated in the accompanying drawings, wherein:

Fig. 1 is a perspective view illustrating the cart or carriage of my invention with the parts thereof in operative erected position.

Fig. 2 is a fragmentary view in side elevation illustrating the relation of certain of the parts of the cart in the aforesaid operative erected position and others in retracted or collapsed position preliminary to collapsing and compacting the cart as a whole.

Fig. 3 is a view in side elevation partially broken away and in vertical section illustrating the cart in an intermediate stage in the collapsing manipulation thereof starting with the position of Fig. 2, the operative position of one of the shelves of the cart prior to collapsing being indicated in dotted lines.

Fig. 4 is a fragmentary view in side elevation illustrating a further stage in the collapsing operation of the structure.

Fig. 5 is a fragmentary front view in section on line 5—5 of Fig. 1, illustrating certain details of construction and arrangement of the parts.

Fig. 6 is a fragmentary view partially broken away and in section on line 6—6 of Fig. 2, illustrating further details of construction.

Fig. 7 is a view in side elevation showing the cart or carriage in fully collapsed position.

Figs. 8 and 9 are enlarged fragmentary views in section on lines 8—8, 9—9, respectively, of Fig. 5, illustrating still further details of construction of the carriage.

The present invention relates to improvements in a carrying cart or carriage of the general type illustrated and described in my Patent 2,141,281 of December 27, 1938, namely, to a carrying cart or carriage such as is widely used by customers in self-serve stores and the like. The present improvements relate to provisions for enabling the carriage as a whole to be collapsed in its entirety to a highly compact form for shipment or storage. This compact collapsing is of great advantage in a store or market and frees space previously used to accommodate these carriages for use in displaying merchandise or for other purposes. The operation of collapsing the carriage is an automatic one requiring only a single movement on the part of the operator to bring the parts to collapsed form. I contemplate that the carriages will be stored on end in a highly compact manner and to further this purpose I incorporate in each of the carts rigid means or feet on which the cart may be supported to take the weight thereof off the wheels and thereby prevent skidding from upright stored position.

In the embodiment of my invention illustrated in the accompanying drawings, the main frame of the cart or carriage comprises crossed pivotally connected front and rear frame members occupying a generally upright position when the carriage is erected. These front and rear carriage frame members or uprights include laterally spaced side members 2, 2 and 3, 3 pivotally connected intermediate the ends thereof at 4 for scissor-like swinging movement from operative erected position illustrated in Fig. 1 to the inoperative or collapsed position illustrated, for example, in Fig. 7. The front frame side members 2, 2 are connected at the upper end by an integral handle 5 provided with a grip 6 for the manipulation of the cart and are laterally braced and maintained in spaced relation at two other points by means of cross bars 7, 8 welded thereto, which bars serve further functions to be hereinafter referred to.

The lowermost ends of the side members 2, 2 are provided with suitable casters 9 appropriately secured thereto as, for example, by welding and the further cross bar or brace 10 extending between and welded to the caster mountings is provided with a pair of downwardly turned and forwardly extending, elongated feet 11 for supporting the cart in stored collapsed position in a manner to be hereinafter referred to.

The side members 3, 3 of the other upright are maintained in laterally spaced relation by the transverse metal cross bars or struts 12, 13 welded thereto as at 121, see Fig. 9, the former of which is provided with a forwardly offset central portion 14 for a purpose to be described. The upright side members 3, 3 are each likewise offset or bulged laterally away from one another at 15 to provide space for the accommodation of the folding or swinging shelves or basket supports to be hereinafter described. The lowermost ends of members 3, 3 have an axle 151 secured therebetween on which the rear wheels 152 are rotatably mounted.

There are a pair of swingable shelves, generally designated 16, 17, respectively, pivotally supported by the above described collapsible frame. Each shelf in the embodiment illustrated is of skeleton outline, consisting of a strap metal border frame member 18 united at its ends by a strip 181 spot welded thereto, see Fig. 6, and longitudinal and transverse basket supporting slats 19 suitably connected as by welding to the border member. The upper shelf 16 is pivotally connected at 20 to the upper ends of side upright members 3, 3, which project above the pivots 4 for the carriage frame uprights, the pivotal connection 20 for the shelf being at a point on the shelf spaced substantially from the rear end of the shelf whereby the said rear end projects substantially rearwardly of the pivot and engages beneath the cross bar 7 in the manner illustrated in Fig. 1 to support shelf 16 in erected position. The said shelf is readily pivoted or swung upwardly and rearwardly from such erected position shown in Fig. 1 and in dotted lines in Fig. 3, to the inoperative collapsed vertical position shown in solid lines in Fig. 3, for the purposes to be described. In the latter position, shelf 16 engages the cross bar or strut 12 in the offset 14 therein, which acts thereafter as a stop preventing further movement of shelf 16 relative to the upright on which it is pivoted.

The lower shelf 17 is preferably pivoted closely adjacent its rear end to the upright side members 3, 3 at the pivot point designated 21 and the forward end of shelf 17 rests on cross bar 25 to normally support the same in operative horizontal position.

The present invention primarily deals with a novel construction whereby the lower shelf 17 is automatically swingable about its pivots 21 from operative horizontal to inoperative vertical position when the pivoted uprights are collapsed relative to one another. Furthermore, it is contemplated that the upper shelf 16, following manual swinging thereof to inoperative position shall be employed as a handle member coacting with handle 5 to effect the automatic collapse of the lower shelf and, in fact, the entire carriage as described.

In accomplishing this, I provide a pair of links 22 each pivoted at one end at 23 to an upright member 2 adjacent the lower end of the latter and also pivoted at 24 to the lower shelf or basket support 17. It will be noted that the border member 18 of lower support 17 is provided with a substantial upward offset 25 in the reach 251 at its sides between pivots 21, 24, which offset serves to elevate the pivot points 24 substantially above a plane through the pivots 21, 23, at which respective points the shelf is connected to the rear upright and the links 22 connected to the forward upright. This brings points 24 with the radial or pivotal distance of points 21 from the upright pivots 4 and insures that collapsing movement of the frames or uprights 2, 3 about their pivot 4 will result in a vertical lifting component of force being exerted on pivot point 24, with the resultant swinging of shelf 17 upwardly and rearwardly about its pivot 21 to inoperative position when the uprights 2, 3 are fully collapsed.

As stated, upper shelf 16 engages within the forwardly offset stop portion 14 of cross bar 12 when the said shelf is swung upwardly from the horizontal dotted line position of Fig. 3 to the vertical inoperative position shown in solid lines. This in effect constitutes the upper shelf 16 a handle member adapted to coact with the handle 5 to pivot the uprights 2, 3 relative to one another and effect a scissor-like collapsing movement thereof about their pivot point 4. Accompanying this movement is the simultaneous automatic collapsing of shelf 17 to inoperative position by reason of the pivoted link arrangement described above. It will be appreciated that link 22 and the reach 251 on the lower shelf between pivot points 21, 24 constitute in effect a toggle which would be locked were the shelf and link pivot points 21, 24, 23 disposed in alinement, however the elevation of point 24 about the line connecting the other two prevents this and enables the effective upward collapsing of the lower shelf in the manner described. The lengths of link 27 and the aforesaid reach are proportioned so that the upward swinging movement of the lower shelf is effected with rapidity and without unusual or undue exertion.

It should be noted that whereas the lower shelf or basket support member 17 has free swinging, antifriction pivots at 21 to facilitate to as great a degree as possible the ready upward swinging of the shelf, the pivots 20 for the upper shelf 16 have substantial friction. This pivot structure is illustrated in Fig. 8, wherein a friction washer 271 is shown interposed between the basket frame 18 and the upright side member 3, the parts being drawn together by the rivet 272 employed to pivotally connect the same in such manner that there is a substantial frictional binding action at this point. This enables upper shelf 16 to be effectively employed as a handle in erecting the cart to operative spread position as well as in collapsing the same to inoperative position, inasmuch as sufficient friction exists to enable the shelf and uprights 3 to be manually swung forwardly together about upright pivots 4 until the lower shelf 17 reaches its horizontal operative position. Following this, upper shelf 16 is swung forwardly and downwardly about its pivots 20 and relative to upright frame 3, 3. The friction present at pivots 20 is sufficient to maintain the shelf in any position relative to the frame in which it is left, but it is not sufficiently great to objectionably hinder this erecting movement.

In Figs. 2, 3, and 4, I illustrate various stages in the automatic collapsing of the shelves as described above. Fig. 2 shows a portion of shelf 16 in inoperative position prior to manipulation of the handles, including the upper end of that shelf, to swingably collapse the uprights. In Fig. 3, the collapsing movement has been commenced and the pivot point 24 is shown at an intermediate point while rising under the upward component exerted thereon by link 22. In Fig. 4, the parts are shown in a further advanced collapsed position. In Fig. 7, the cart is shown in fully collapsed position. Referring to the last named figure, it will be perceived that following full collapse of the cart to inoperative position the same may be rocked over onto the elongated feet 11, which project beyond casters 9 in that condition, for storing the cart in upright position on a floor and thereby removing the weight of the cart from the casters. This prevents inadvertent slipping or skidding of the cart from said collapsed erect position.

The parts of the foregoing cart may be extremely light in weight, though amply strong and rigid to withstand any usage to which the cart is normally put. It will be appreciated that the foregoing features of construction have adaptability for other uses than the particular one referred to, however the automatic collapsibility, extreme lightness, and inexpensiveness of the structure render the same extremely well suited as a wheeled cart provided for the use of customers in self-serve stores, since it may be quickly and easily erected or collapsed to an extremely compact form. Substantial economies of floor space are effected by rendering the space otherwise employed for the storage of these carts available for display or other purposes.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. In a cart of the type described, a pair of pivotally connected uprights swingable in scissor-like manner from an operative erected position to inoperative collapsed position and vice versa, upper and lower shelves pivoted to one of said uprights respectively above and below the pivotal connection of the uprights and swingable from operative horizontal to inoperative vertical position and vice versa, the pivot for the lower shelf being disposed adjacent the rear of the shelf, means for supporting said shelves in operative horizontal position, a stop on the upright to which the upper shelf is pivoted engageable by the latter upon swinging thereof to inoperative position, whereby further swinging effort exerted thereon is transmitted to said upright tending to collapse the uprights to inoperative position, and a link pivotally connected to said lower shelf between the free swinging end of the latter and its pivot to said last named upright, said link being also pivoted to the other upright adjacent the lowermost end thereof, the link-shelf pivot connection being disposed above the plane of the link-upright pivot and the lower shelf-upright pivot, whereby collapsing movement of the uprights produced by collapsing manipulation of the inoperatively positioned upper shelf in conjunction with said other upright automatically causes said link to thrust the lower shelf upwardly at the link-shelf pivot and swing the lower shelf to inoperative vertical position, said uprights having rollers at the lower ends thereof.

2. In a cart of the type described, a pair of pivotally connected uprights swingable in scissor-like manner from an operative erected position to inoperative collapsed position and vice versa, upper and lower shelves pivoted to one of said uprights respectively above and below the pivotal connection of the uprights and swingable from operative horizontal to inoperative vertical position and vice versa, means for supporting said shelves in operative horizontal position, a stop on the upright to which the upper shelf is pivoted engageable by the latter upon swinging thereof to inoperative position, whereby further swinging effort exerted thereon is transmitted to said upright tending to collapse the uprights to inoperative position, and a link pivotally connected to said lower shelf between the free swinging end of the latter and its pivot to said last named upright, said link being also pivoted to the other upright, the link-shelf pivot connection being disposed above the plane of the link-upright pivot and the lower shelf-upright pivot, whereby collapsing movement of the uprights produced by collapsing manipulation of the inoperatively positioned upper shelf in conjunction with said other upright automatically causes said link to thrust the lower shelf upwardly at the link-shelf pivot and swing the lower shelf to inoperative vertical position.

3. In a cart of the type described, a pair of pivotally connected uprights swingable in scissor-like manner from an operative erected position to inoperative collapsed position and vice versa, upper and lower shelves pivoted to one of said uprights and swingable from operative horizontal to inoperative vertical position and vice versa, means for supporting said shelves in operative horizontal position, a stop on the upright to which the upper shelf is pivoted engageable by the latter upon swinging thereof to inoperative position, whereby further swinging effort exerted thereon is transmitted to said upright tending to collapse the uprights to inoperative position, and a link pivotally connected to said lower shelf between the free swinging end of the latter and its pivot to said last named upright, said link being also pivoted to the other upright, the link-shelf pivot connection being disposed above the plane of the link-upright pivot and the lower shelf-upright pivot, whereby collapsing movement of the uprights produced by collapsing manipulation of the inoperatively positioned upper shelf in conjunction with said other upright automatically causes said link to thrust the lower shelf upwardly at the link-shelf pivot and swing the lower shelf to inoperative vertical position.

4. In a cart of the type described, a support comprising a pair of pivotally connected uprights swingable in scissor-like manner from an operative erected position to inoperative collapsed position and vice versa, upper and lower shelves pivoted to said support uprights and swingable from operative horizontal to inoperative vertical position and vice versa, means for supporting said shelves in operative horizontal position, a stop on the upright to which the upper shelf is pivoted engageable by the latter upon swinging thereof to inoperative position, whereby further swinging effort exerted thereon is transmitted to said upright tending to collapse the uprights to inoperative position, and a link pivotally connected to said lower shelf between the free swinging end of the latter and its connection to the upright on which it is pivoted, said link being also pivoted to the other upright, the link-shelf pivot connection being disposed above the plane of the link-upright pivot and the lower shelf-upright pivot, whereby collapsing manipulation of the inoperatively positioned upper shelf in conjunction with said other upright automatically causes said link to thrust the lower shelf upwardly at the link-shelf pivot and swing the lower shelf to inoperative vertical position.

5. In a structure of the type described, a frame comprising a pair of pivotally connected uprights swingable in scissor-like manner from an operative spread position to inoperative collapsed position and vice versa, upper and lower support members pivoted to one of said uprights respectively above and below the pivotal connection of the uprights and swingable vertically from operative horizontal to inoperative vertical position and vice versa, the pivot for the lower member being disposed adjacent the rear of the shelf, means for supporting said members in operative horizontal position, a stop on the upright to which the upper member is pivoted engageable by the latter upon swinging thereof to inoperative position, whereby further similar swinging effort exerted thereon is transmitted to said upright tending to collapse the uprights to inoperative position, and a link pivotally connected to said lower member between the free swinging end thereof and its pivot to said last named upright, said link being also pivoted to the other upright adjacent the lowermost end thereof, the pivotal link-member connection being disposed above a line connecting the link-upright pivot and the lower member-upright pivot, whereby collapsing movement of the uprights produced by collapsing manipulation of the inoperatively positioned upper member in conjunction with said other upright automatically causes said link to thrust the lower member upwardly at the link-member pivot and swing the lower member to inoperative vertical position.

6. In a structure of the type described, a frame comprising a pair of pivotally connected uprights swingable in scissor-like manner from an operative spread position to inoperative collapsed position and vice versa, upper and lower support members pivoted to one of said uprights respectively above and below the pivotal connection of the uprights and swingable vertically from operative horizontal to inoperative vertical position and vice versa, means for supporting said members in operative horizontal position, a stop on the upright to which the upper member is pivoted engageable by the latter upon swinging thereof to inoperative position, whereby further similar swinging effort exerted thereon is transmitted to said upright tending to collapse the uprights to inoperative position, and a link pivotally connected to said lower member between the free swinging end thereof and its pivot to said last named upright, said link being also pivoted to the other upright adjacent the lowermost end thereof, the pivotal link-member connection being disposed above a line connecting the link-upright pivot and the lower member-upright pivot, whereby collapsing movement of the uprights produced by collapsing manipulation of the inoperatively positioned upper member in conjunction with said other upright automatically causes said link to thrust the lower member upwardly at the link-member pivot and swing the lower member to inoperative vertical position.

7. In a structure of the type described, a frame comprising a pair of pivotally connected uprights swingable in scissor-like manner from an operative spread position to inoperative collapsed position and vice versa, upper and lower support members pivoted to one of said uprights and swingable vertically from operative horizontal to inoperative vertical position and vice versa, means for supporting said members in operative horizontal position, a stop on the upright to which the upper member is pivoted engageable by the latter upon swinging thereof to inoperative position, whereby further similar swinging effort exerted thereon is transmitted to said upright tending to collapse the uprights to inoperative position, and a link pivotally connected to said lower member between the free swinging end thereof and its pivot to said last named upright, said link being also pivoted to the other upright, the pivotal link-member connection being disposed above a line connecting the link-upright pivot and the lower member-upright pivot, whereby collapsing movement of the uprights produced by collapsing manipulation of the inoperatively positioned upper member in conjunction with said other upright automatically causes said link to thrust the lower member upwardly at the link-member pivot and swing the lower member to inoperative vertical position.

8. In a structure of the type described, a frame comprising a pair of pivotally connected uprights swingable in scissor-like manner from an operative spread position to inoperative collapsed position and vice versa, upper and lower support members pivoted to said uprights and swingable vertically from operative horizontal to inoperative vertical position and vice versa, means for supporting said members in operative horizontal position, a stop on the upright to which the upper member is pivoted engageable by the latter upon swinging thereof to inoperative position, whereby further similar swinging effort exerted thereon is transmitted to said upright tending to collapse the uprights to inoperative position, and a link pivotally connected to said lower member between the free swinging end thereof and its connection to the upright on which it is pivoted, said link being also pivoted to the other upright, the pivotal link-member connection being disposed above a line connecting the link-upright pivot and the lower member-upright pivot, whereby collapsing movement of the uprights produced by collapsing manipulation of the inoperatively positioned upper member in conjunction with said other upright automatically causes said link to thrust the lower member upwardly at the link-member pivot and swing the lower member to inoperative vertical position.

9. In a cart of the type described, an upright support comprising a pair of pivotally connected uprights swingable from operative spread position to inoperative collapsed position and vice versa, means on said support engageable by said members to sustain the same in operative horizontal position, the upper member being swingable relative to said one of said uprights in its movement to and from inoperative position and said one of said uprights being engageable by said upper member in said inoperative position whereby further relative swinging movement in that direction is prevented, said upper member thereafter constituting a handle for effecting relative collapsing of the uprights relative to one another to inoperative position, and a link pivotally connected to the lower member and to the other upright whereby collapsing movement of the uprights effected by manipulation of the upper member automatically elevates and swings the lower member about its upright pivot, the pivot of the upper member to the upright having sufficient friction to enable the upper member to be manipulated as a handle in actuating the uprights to operative spread position.

10. In a cart of the type described, an upright support comprising a pair of pivotally connected uprights swingable from operative spread position to inoperative collapsed position and vice versa, upper and lower support members pivoted on said support and swingable thereon from horizontal operative to vertical inoperative position and vice versa, the lower member being pivoted on one of the uprights, stops on said support engageable by said members to support the same in operative horizontal position, said one of said uprights having a stop engageable by said upper member in its inoperative position whereby further swinging movement thereof relative to said upright is prevented, said upper member thereafter constituting a handle for effecting collapse of the uprights relative to one another to inoperative position, and means pivotally connected to the lower member and to the upright, with the pivotal connection of said means to the member elevated above a line between the pivot of the lower member to said one of said uprights and the lower member-means pivot whereby collapsing movement of the uprights by manipulation of the upper member automatically elevates and swings the lower member about its pivot to the support.

11. In a cart of the type described, an upright support comprising a pair of pivotally connected uprights swingable from operative spread position to inoperative collapsed position and vice versa, upper and lower support members pivoted on said support and swingable thereon from horizontal operative to vertical inoperative position and vice versa, the lower member being pivoted on one of the uprights, stops on said support engageable by said members to support the same in operative horizontal position, said one of said uprights having a stop engageable by said upper member in its inoperative position whereby further swinging movement thereof relative to said upright is prevented, said upper member thereafter constituting a handle for effecting collapse of the uprights relative to one another to inoperative position, and means pivotally connected to the lower member and to the upright, whereby collapsing movement of the uprights by manipulation of the upper member automatically elevates and swings the lower member about its pivot to the support, the pivot of said upper member to said support having sufficient friction to enable the upper member to be manipulated as a handle in actuating the uprights to operative spread position.

12. In a structure of the class described, the combination of front and rear uprights comprising pivotally connected side members, the front upright being provided with a handle at the upper end thereof and with caster wheels at the lower end, the rear upright being provided with wheels at its lower end, the side members of the rear upright extending a relatively short distance above the upright side member pivots, a top shelf pivoted to the upper ends of the rear upright side members, a stop on said front upright for supporting said shelf in its erected position, a stop on said rear upright with which said top shelf engages when it is swung to an upright partially collapsed position, said top shelf being swingable from engagement with one of said stops to the other when the uprights are in erected relation to each other, a lower shelf pivotally mounted between the side members of the rear upright to swing upwardly between them to collapsed position and to swing downwardly between the side members of the front uprights to erected position, and links pivotally connected to the side members of the front upright and to the bottom shelf whereby when the uprights are swung to collapsed position the bottom shelf is automatically actuated with the erecting and collapsing of said uprights.

13. In a structure of the class described, the combination of crossed pivotally connected front and rear frame members, the front frame member being provided with a handle at its upper end and with wheels at its lower end, the rear frame member being provided with wheels at its lower end, a lower shelf pivotally connected to the rear frame member, links connecting said lower shelf to the front frame member whereby the lower shelf is swung to and from erected position upon the erecting and collapsing movement of said frame members, a top shelf pivoted on the rear frame member above the pivot connection for the frame members, a means for holding said top shelf in erected position, and a stop on said rear frame member with which said top shelf engages when the shelf is swung from its erected position to a partially collapsed position, said top shelf then constituting a handle extension for said rear frame member for collapsing and erecting the frame members and thereby collapsing and erecting the bottom shelf, said top shelf having a substantial coefficient of friction in its connection to said rear frame member so that the shelf constitutes means through which erecting force may be applied.

14. In a structure of the class described, the combination of crossed pivotally connected front and rear frame members, the front frame member being provided with a handle at its upper end and with wheels at its lower end, the rear frame member being provided with wheels at its lower end, a lower shelf pivotally connected to the rear frame member, links connecting said lower shelf to the front frame member whereby the lower shelf is swung to and from erected position upon the erecting and collapsing movement of said frame members, a top shelf pivoted on the rear frame member above the pivot connection for the frame members, a means for holding said top shelf in erected position, and a stop on said rear frame member with which said top shelf engages when the shelf is swung from its erected position to a partially collapsed position, said top shelf then constituting a handle extension for said rear frame member for collapsing and erecting the frame members and thereby collapsing and erecting the bottom shelf.

WALTER H. SCHRAY.